Patented Aug. 9, 1932

1,870,802

UNITED STATES PATENT OFFICE

CARL RAYMOND FELLERS, OF AMHERST, MASSACHUSETTS, ASSIGNOR TO THE HILLS BROTHERS COMPANY, OF NEW YORK, N. Y., A CORPORATION OF NEW YORK

METHOD OF TREATING DRIED FRUITS

No Drawing.   Application filed January 24, 1931. Serial No. 511,106.

This invention relates to the treatment of dried fruits, such as dates, figs, raisins, prunes, peaches, apricots, currants and the like for the purpose of destroying or rendering innocuous the pathogenic or disease producing organisms contained therein. My method may, accordingly, be described as a pasteurizing treatment and in addition to the result mentioned, it also destroys yeasts, and eggs, larvæ, pupæ and adults of insects. For purposes of illustration the details of the process will be described in connection with the treatment of dates, although it is to be understood that its utility is not limited to any particular fruit.

At the present time tremendous quantities of dried fruits are consumed in this country, some of the fruits being produced here while others are imported. These fruits contain microorganisms, such as bacteria, molds, yeasts, etc., in varying numbers, and it has been demonstrated by research that disease transmission may be effected by such fruits. At least one outbreak of severe colitis has been traced to dried fruits, and the treatment of the fruits to destroy or render innocuous organisms of a pathogenic character is therefore a matter of grave concern from the standpoint of public health.

Dates consumed in this country are to a large extent produced abroad and shipped into this country in bulk. The dates as received here are raw and, although dried on the trees they are given no special heat treatment, such as is applied to other fruits either by evaporation in the sun or by dehydration in stack, kiln, or forced draft tunnels. Neither are the dates subjected to sulphuring which apparently destroys some organisms; at least in my experiments I have found the lowest bacteria counts in sulphured fruits. Dates are now customarily sold in sealed paper cartons, although some retail sales of bulk dates are still made.

In my investigations of bulk and packaged dates from the same general sources, I have found that while, as a rule, the bacteria counts are higher in bulk dates, there are instances in which samples of bulk dates have shown no intestinal bacteria, while such bacteria were found in the packaged dates. This indicates that dates may be readily contaminated during repacking, so that in the case of dates as well as in other fruits of this character, it is imperative for best results that the fruits be subjected to the pasteurizing treatment after they have been placed in the cartons and are otherwise ready for sale.

It is also important from the standpoint of the manufacturer that the treatment to be given the fruits should do no injury to their color, texture, odor, flavor and other physical characteristics and the treatment should be one that can be carried on economically, as for example, by treatment of large quantities at the same time and for a relatively short period.

I have found that packaged dried fruits may be given a satisfactory treatment which fulfills the requirements above set forth, by subjecting the fruits to relatively high temperatures in a humid atmosphere. Successful results depend on maintaining certain relations between time, temperature and humidity, and when large quantities of the fruits are treated at the same time, as in a heating chamber or oven, it is essential that good circulation be provided to insure uniform conditions so that all of the fruit will receive the same treatment.

The equipment used may be of any suitable or conveient type but I prefer to employ a continuous apparatus through which the packages may be carried on a conveyor along a path such that the fruits move through substantially all parts of the heating chamber and at a rate of speed which results in their undergoing treatment for the desired length of time.

In pasteurizing dates, the factors involved vary considerably with the different types and varieties so that no general and exact rule can be given. However, certain time-temperature-humidity relations should be observed and when that is done, the results obtained are most encouraging, particularly in that I have found that the process not only destroys a large proportion of the microorganisms, present, including all intestinal and tuberculosis bacteria, and thus produces a safe food, but also improves the dates in appearance, texture and flavor.

The temperature to which the dates are subjected during pasteurizing by my process varies from 150° to 185° F. (in the fruit), the relative humidities vary from about 60% to 100%, and the time consumed runs from 20 minutes to above 90 minutes, to which must be added a preliminary or coming-up time of 10 to 30 minutes according to the temperature of pasteurization employed. Some success has been attained with a treatment lasting about 20 minutes during which the dates were subjected to high temperatures of 185° F. or more at high humidities, but carrying on the pasteurization under such conditions is not recommended because of the likelihood of injuring the fruit with respect to its physical characteristics. Ordinarily, the process involves the use of temperatures (in the fruit) of 160° F. to 170° F. and relative humidities of 70% or more for periods of 40 minutes or more. I have found that a decrease in temperature to some extent may be compensated for by an increase in humidity; for instance, maintaining the dates for a period of one hour at a temperature of 160° F. at a relative humidity of 70% or somewhat more gives results comparable to a treatment for the same period at a temperature of 150° F. in a saturated atmosphere. Also, treatment for 80 minutes at 160° F. in an atmosphere of 62% relative humidity produces results comparable with a treatment for the same length of time at 150° F. with a relative humidity of 90%.

While the conditions under which pasteurization is carried out vary considerably for different fruits, I have found that a reduction of pathogenic organisms similar to that obtained in the case of dates may also be secured with my process in connection with prunes, peaches, raisins, currants, apricots and figs, although figs are more difficult to handle. In each instance, the treatment is carried on preferably by introducing wet steam into the heated pasteurizing chamber through fine spray nozzles and thoroughly mixing it with the air by circulating means, such as fans. The percentage of humidity can then be calculated by the use of dry-bulb and wet-bulb thermometers, preferably of the recording type, and regulated as desired. In every case in which large quantities of the fruit are undergoing pasteurization at the same time, it is essential that good circulation be maintained in the chamber since otherwise the fruit would be exposed to varying conditions in different parts of the chamber and some of the fruit might not receive treatment sufficient to destroy the organisms.

In general, it may be said that high temperatures are likely to reduce the moisture content of the fruit, while at preferred temperatures the moisture content is increased slightly, for example, 1–5%. This increase in moisture improves the quality of the fruit, delays the crystallization of the sugar, and dissolves any sugar crystals which have already formed on the surface or in the flesh of the fruit. I find that for most purposes a temperature of 170° F. with a humidity of at least 70% and an exposure time of 40 minutes or more gives best results. Lower temperatures may be employed with the more acid fruits, peaches, apricots and prunes being efficiently pasteurized at lower temperatures than figs or dates.

It will be apparent from the foregoing that my new process produces highly beneficial results in that a safe fruit results from destruction of the intestinal and tuberculosis bacteria, souring caused by the action of yeasts is prevented, and injury due to the action of insects is avoided. Under proper conditions of treatment, the fruit may be materially improved in quality by solution of sugar crystals present and increase in the moisture content, while no harm is done to the color, odor, texture or flavor of the fruit.

I claim:

1. A process for treating packaged dried fruit to render innocuous microorganisms and insects carried by the fruit which comprises subjecting the entire fruit in packages to a temperature of at least 150° F. at a relative humidity of at least 60%, and continuing the treatment for a period of at least 25 minutes.

2. A process for treating packaged dried fruit to render innocuous microorganisms and insects carried by the fruit which comprises subjecting the entire fruit in packages to a temperature of at least 150° F. at a relative humidity of at least 70% for a period of from 25 to 90 minutes.

3. A process for treating dried packaged fruit to render innocuous microorganisms and insects carried by the fruit which comprises subjecting the entire fruit in retail cartons to a temperature of from 150° to 185° F. at a relative humidity from 70% to 100% for a period of from 25 to 90 minutes.

4. A process for treating dried packaged fruit to render innocuous microorganisms and insects carried by the fruit which comprises subjecting the entire fruit in retail cartons to a temperature from 160° to 185° F. at a relative humidity of from 70% to 100% for a period of from 30 to 90 minutes.

5. A process for treating dried packaged fruit to render innocuous microorganisms and insects carried by the fruit which comprises subjecting the entire fruit in retail cartons to a temperatures of approximately 170° F. for a period of at least 25 minutes at a high relative humidity in excess of 70%.

6. A process for treating packaged dried fruit to render innocuous microorganisms and insects carried by the fruit which comprises raising the temperature of the entire fruit in retail cartons over a considerable period of time to at least 150° F. in an atmosphere at a relative humidity of at least 70%, and thereafter maintaining the temperature in the fruit and the relative humidity of said atmosphere within the specified ranges for a period of at least 25 minutes.

7. A process for treating packaged dried fruit to render innocuous microorganisms and insects carried by the fruit which comprises raising the temperature of the entire fruit in retail cartons during a period of from 10 to 30 minutes to at least 150° F. in an atmosphere at a relative humidity of at least 70%, and thereafter maintaining the temperature in the fruit and the relative humidity of said atmosphere within the specified ranges for a period of at least 25 minutes.

8. A process for treating dried packaged fruit to render innocuous microorganisms and insects carried by the fruit which comprises placing the fruit in retail cartons in a chamber, subjecting the chamber to a preliminary heating to raise the temperature throughout the entire fruit to a value from 150° to 185° F., maintaining the fruit at a temperature within said range and in an atmosphere at a relative humidity of 60% to 100%, circulating the atmosphere within the chamber, and maintaining the treatment for a period of at least 25 minutes.

9. A process for treating packaged dates to render innocuous microorganisms and insects carried by the fruit which comprises subjecting the dates in retail packages to a temperature from 150° to 185° F. at a relative humidity of at least 60% for a period of at least 25 minutes, the entire mass of each date being raised to the specified temperature during such treatment.

10. A process for treating packaged dates to render innocuous microorganisms and insects carried thereby, which comprises subjecting the dates in retail packages to a temperature of at least 170° F. at a relative humidity of at least 66% for a period of at least 40 minutes, the dates being heated entirely through to the specified temperature during said treatment.

In testimony whereof I affix my signature.

CARL RAYMOND FELLERS.